United States Patent Office 3,312,712
Patented Apr. 4, 1967

---

3,312,712
2-(3-CARBOXYL AND 3-CARBAMYL-PYRIDINIUM) SUCCINIC ACID BETAINES AND A METHOD FOR THEIR PREPARATION
Jean-Louis Delarue, Paris, and Yves Louis-Marie Fellion, Gagny, France, assignors to Laboratoires Toraude, Paris, France, a French society
No Drawing. Filed Feb. 12, 1965, Ser. No. 432,418
Claims priority, application Great Britain, Feb. 19, 1964, 6,903/64
6 Claims. (Cl. 260—295.5)

This invention is concerned with certain novel substituted pyridine derivatives and with a process for their preparation.

The new compounds of this invention are betaines of the formula:

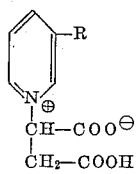

where R is a carboxyl group or a carbonamide group, the nitrogen atom of which may, if desired, be substituted with one or more lower alkyl groups.

These new betaines may be prepared by taking advantage of the special property of some pyridine tertiary amines to add themselves to the double bond of unsaturated organic acids according to the following reaction diagram:

(1) Formation of the pyridine maleate ion (I)

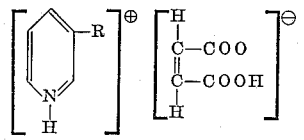

(2) Betainification, by transfer of the hydrogen atom of ion (I) to the beta-carbon atom of the ethylenic bond:

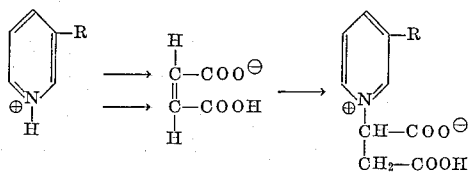

In carrying out the reaction, the maleic acid is generated in situ from D-1-bromosuccinic acid.

The following examples are given by way of illustration only:

EXAMPLE 1

2-(3-carbamyl-pyridinium) succinic acid betaine

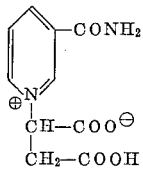

24.4 g. (0.2 ml.) of nicotinic amide was dissolved in 200 ml. of ethanol at 95° C. To this solution was added 39.4 g. (0.2 ml.) of D-1-bromosuccinic acid dissolved in 200 ml. of ethanol at 95° C. This solution is kept at 50° C. for 3 hours. The solution was then concentrated to a volume of 100 ml. and an excess of silver hydroxide in suspension in water, i.e., 0.3 ml. in 100 ml. of water, was added. The mixture was brought to a temperature of 90° C., it was agitated for 5 minutes and then the silver salts were eliminated by filtration.

The crude product was recrystallized from boiling water. 2-(3-carbamyl-pyridinium) succinic acid betaine was obtained in a yield of 50% as a pure product with the following characteristics.

Crystalline form: white prismatic rods.
Instantaneous melting temperature on block=+245° C.
Analysis ($C_{10}H_{10}O_5N_2$): Calculated: C=50.41%, H=4.23%, N=11.76%. Found: C=50.5%, H=4.19%, N=11.71%.

In an alternative method of preparation, the silver hydroxide is replaced by an ion-exchange resin for example, "Amberlite" resin.

EXAMPLE 2

2-(3-diethylcarbamyl pyridinium) succinic acid betaine monohydrate

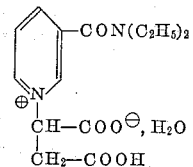

The process was carried out as in Example 1 except that the nicotinamide was replaced by N,N-diethylnicotinamide. The results obtained were comparable with those obtained in Example 1.

2-(3-diethylcarbamyl-pyridinium) succinic acid betaine was obtained in the monohydrated form in a yield of 40%, as a product with the following characteristics.

Crystalline form: white rods.
Instantaneous melting point on block=153° C.
Analysis ($C_{14}H_{18}O_5N_2$, $H_2O$): Calculated: C=53.5%, H=6.35%, N=7.8%. Found: C=53.4%, H=6.2%, N=7.8%.

The new betaines have valuable lipotropic properties and are suitable for human administration as lipotropic agents. The invention accordingly includes pharmaceutical preparations containing the new betaines.

In human medicine, these betaines exhibit lipotropic properties at the hepatic cell and vascular endothelium level, making them suitable as therapeutic agents particularly for the treatment of hepatic disorders and disorders of the vascular wall, atheromatosis and atherosclerosis.

These properties can be demonstrated pharmacologically on animals in which a metabolic disorder has been induced either by prolonged fast or by lipidic overload, and in such cases the compounds have the effect of reducing the percentage of total hepatic fatty acids or increasing the percentage of lipotropic acidity determinable by Draegstedt's formula, or the effect of providing protection against chloroform poisoning.

The following pharmacological tests are given by way of illustration:

Test 1.—Comparison of the biological results obtained with rabbits which had received a lipidic overload in accordance with the technique described in detail in "Agressologie," 1963, IV, 45–51, in animals which during the six days following the cessation of the overloading had received 200 mg./kg. of 2-(3-carbamylpyridinium) succinic acid betaine orally in suspension containing gum arabic, and in controls which had received only the lipidic overload, showed that:

(i) The above-mentioned betaine reduces the percentages of hepatic fatty acids.

(ii) The percentage of lipotropic activity of this betaine is very high and greater than that of choline.

The results obtained are tabulated below:

|  | Controls | Controls which did not receive overload | Betaine | Choline |
|---|---|---|---|---|
| Total hepatic fatty acids, g./100 g. of dry liver | 12.14 ±2.37 | 18.43 ±1.90 | 10.87 ±1.22 | 10.08 ±0.52 |
| Cold extracted hepatic lipides, g./100 g. of dry liver | 1.21 ±0.049 | 2.98 ±0.67 | 3.26 ±0.78 | 1.96 ±0.34 |
| Percentage of lipotropic activity | | | 93.3 | 92.7 |

The percentage of lipotropic activity is obtained by Draegstedt's formula:

$$\text{Percent} = \frac{L-C}{S-C}$$

where

L is the total hepatic lipides in g. per 100 g. of liver of treated animals,

S is the number obtained under the same conditions for untreated sick animals, and C is the number obtained under the same conditions for animals on a normal diet.

Test 2.—Comparison of the biological results obtained with rabbits in which a metabolic disturbance of endogenous origin produced by a fast of 6 days (Ammerman, C. B.; & Coll., A.J.P. 1961, 200, 75–79) causes an increase in hepatic biosynthesis of cholesterol in the animals which during the last three days of the test had received 200 mg./kg. orally of 2-(3-carbamyl-pyridinium) succinic acid betaine, and in controls which had only undergone the fast, showed that:

This betaine gave a marked reduction of the proportion of hepatic fatty acids. Its percentage of lipotropic activity is very significant.

The results obtained are tabulated below:

|  | Controls | Controls subjected to fasting | Betaine |
|---|---|---|---|
| Total hepatic fatty acids. G. per 100 g. of dry liver | 12.14 ±2.37 | 19.04 ±1.85 | 15.47 ±0.45 |
| Percentage of lipotropic activity | | | 56.1 |

Test 3.—Comparison of the biological results obtained with mice in which a fatty degeneration of the liver was produced by subcutaneous injection of 1.25 ml./kg. of an oily chloroform solution (5% in groundnut oil) in accordance with G. E. Paget's technique "Toxi and Applied Pharm.," 1961, 3, 595–605, in:

Animals treated with 2-(3-carbamyl-pyridinium) succinic acid betaine in a dose of 400 mg./kg. orally during the 2 days preceding and just before the chloroform injection, and then 3 and 6 hours afterwards;

Untreated animals receiving the same injection;

Controls, showed that this betaine effectively protects the mouse from chloroform poisoning, the percentage of the reduction of total hepatic lipides being 58.3% as against 38.1% in the case of choline under the same experimental conditions.

The results obtained are tabulated below:

|  | Controls | Controls plus chloroform | Betaine | Percent decrease |
|---|---|---|---|---|
| Cold extracted hepatic lipides, g. per 100 g. of dry liver | 2.47 ±0.20 | 19.30 ±1.07 | 8.05 ±0.93 | 58.3 |

For human administration, the new betaines are conveniently administered orally in the form of hard gelatin capsules containing 500 mg. of the active compound. For the treatment of hepatic disorders, a suitable dosage is 2 to 6 g. of the active compound daily and for the treatment of degenerative cardio-vascular diseases, a suitable dosage is 4 to 8 g. of the active compound daily for 15 days each month for 3 successive months.

We claim:

1. A process for the preparation of a 2-(3-substituted-pyridinium) succinic acid betaine, the pyridine ring of which is substituted in the 3-position by a group selected from the group consisting of carboxyl, carbonamide, N-(lower alkyl)-carbonamide and N,N-di(lower alkyl)-carbonamide, which comprises the step of reacting a pyridine derivative selected from the group alkyl)-substituted nicotinic acid, nicotinamide, N-(lower alkyl)-substituted nicotinamides and N,N-di(lower alkyl)-substituted nicotinamides, with D-1-bromosuccinic acid in the presence of silver hydroxide under conditions whereby said bromosuccinic acid is converted to maleic acid in situ.

2. A process for the preparation of a 2-(3-substituted-pyridinium) succinic acid betaine, the pyridine ring of which is substituted in the 3-positon by a group selected from the group consisting of carboxyl, carbonamide, N-(lower alkyl)-carbonamide and N,N-di(lower alkyl)-carbonamide, which comprises the step of reacting a pyridine derivative selected from the group consisting of nicotinic acid, nicotinamide, N-(lower alkyl)-substituted nicotinamides and N,N-di(lower alkyl)-substituted nicotinamides, with D-1-bromosuccinic acid in the presence of an ion-exchange resin under conditions whereby said bromosuccinic acid is converted to maleic acid in situ.

3. Betaines of the formula:

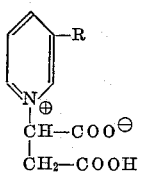

where R is elected from the group consisting of carboxyl, carbonamide, N-(lower alkyl)-carbonamide and N,N-di-(lower alkyl)-carbonamide.

4. 2-(3-carboxyl-pyridinium) succinic acid betaine.
5. 2-(3-carbamyl-pyridinium) succinic acid betaine.
6. 2 - (3 - diethylcarbamyl - pyridinium) succinic acid betaine.

References Cited by the Examiner

Lutz: Berichte Jahrg: 43 (1910), pages 2636–40.

WALTER A. MODANCE, *Primary Examiner.*

ALAN L. ROTMAN, *Assistant Examiner.*